(12) United States Patent
Walter et al.

(10) Patent No.: US 9,553,999 B2
(45) Date of Patent: *Jan. 24, 2017

(54) METHOD AND APPARATUS FOR NOTIFYING AN END USER OF A MESSAGING EVENT IN A MULTI-USER SETTING

(75) Inventors: Edward Walter, Boerne, TX (US); Larry B. Pearson, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 826 days.

This patent is subject to a terminal disclaimer.

(21) Appl. No.: 13/114,082

(22) Filed: May 24, 2011

(65) Prior Publication Data
US 2011/0222677 A1 Sep. 15, 2011

Related U.S. Application Data

(63) Continuation of application No. 11/549,382, filed on Oct. 13, 2006, now Pat. No. 7,970,116.

(51) Int. Cl.
*H04M 3/42* (2006.01)
*H04M 19/04* (2006.01)
*H04M 1/57* (2006.01)
*H04M 1/723* (2006.01)
*H04M 1/725* (2006.01)

(52) U.S. Cl.
CPC ............... *H04M 19/04* (2013.01); *H04M 1/57* (2013.01); *H04M 1/723* (2013.01); *H04M 1/72547* (2013.01)

(58) Field of Classification Search
CPC .... H04M 19/041; H04M 1/2745; H04M 1/57; H04M 1/575; H04M 3/436; H04M 15/06; H04M 1/274516; H04M 1/663; H04M 1/72519; H04M 3/42042; H04M 3/4288; H04M 3/4931; H04M 7/12; H04M 1/576; H04M 1/652; H04M 1/72544; H04M 2203/2066; H04M 19/04; H04M 3/42051; H04M 1/2535; H04M 1/656; H04M 1/72552; H04M 1/72563; H04M 2250/12; H04M 3/02; H04M 1/65; H04M 2203/551; H04M 1/723; H04M 1/72547; H04M 1/72513; H04M 1/72525
USPC ........... 379/82, 179, 207.09, 207.16, 211.03, 379/252, 375.01, 911, 401, 567, 702, 379/110.01, 373.04, 76, 88.22, 102.02, 379/111, 112.01, 114.05, 142.04, 164, 379/167.08, 211.04, 231, 373.01, 67.1, 379/88.12, 88.13
See application file for complete search history.

(56) References Cited

U.S. PATENT DOCUMENTS 5,621,731 A * 4/1997 Dale ................ H04M 3/42314
370/257
6,122,347 A 9/2000 Borland
(Continued)

*Primary Examiner* — Akelaw Teshale
(74) *Attorney, Agent, or Firm* — Guntin & Gust, PLC; Atanu Das

(57) ABSTRACT

A method and apparatus for notifying an end user of a messaging event in a multi-user setting is disclosed. An apparatus that incorporates teachings of the present disclosure may include, for example, a non-transitory computer-readable storage medium in a communication device which includes computer instructions at least for matching a caller identifier associated with a messaging event and entries in a plurality of contact books corresponding to a plurality of users, and identifying a plurality of parties to whom the messaging event is potentially directed based on the matching. Additional embodiments are disclosed.

20 Claims, 6 Drawing Sheets

(56) References Cited

U.S. PATENT DOCUMENTS

| | | | |
|---|---|---|---|
| 6,178,230 B1* | 1/2001 | Borland | H04M 1/578 379/153 |
| 6,385,303 B1 | 5/2002 | Peterson | |
| 6,711,239 B1* | 3/2004 | Borland | 379/67.1 |
| 6,748,058 B1* | 6/2004 | Schwend | H04M 1/576 379/142.06 |
| 7,346,662 B2* | 3/2008 | Koch et al. | 709/206 |
| 7,616,741 B2 | 11/2009 | Reynolds | |
| 8,107,957 B1* | 1/2012 | O'Neil | H04M 3/42229 370/352 |
| 2003/0147518 A1 | 8/2003 | Albal | |
| 2003/0198322 A1* | 10/2003 | White, Jr. | H04M 3/42153 379/88.19 |
| 2004/0067751 A1* | 4/2004 | Vandermeijden et al. | 455/414.1 |
| 2004/0139318 A1* | 7/2004 | Fiala | G06Q 20/3558 713/165 |
| 2004/0156491 A1 | 8/2004 | Reding | |
| 2005/0100152 A1* | 5/2005 | Pearson | H04M 3/42 379/207.16 |
| 2005/0249344 A1 | 11/2005 | Mueller | |
| 2006/0251229 A1* | 11/2006 | Gorti | H04L 12/2814 379/142.02 |

* cited by examiner

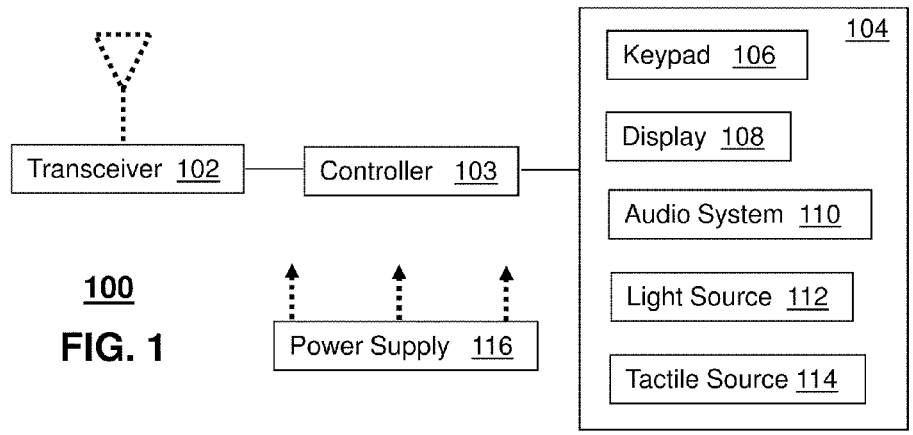
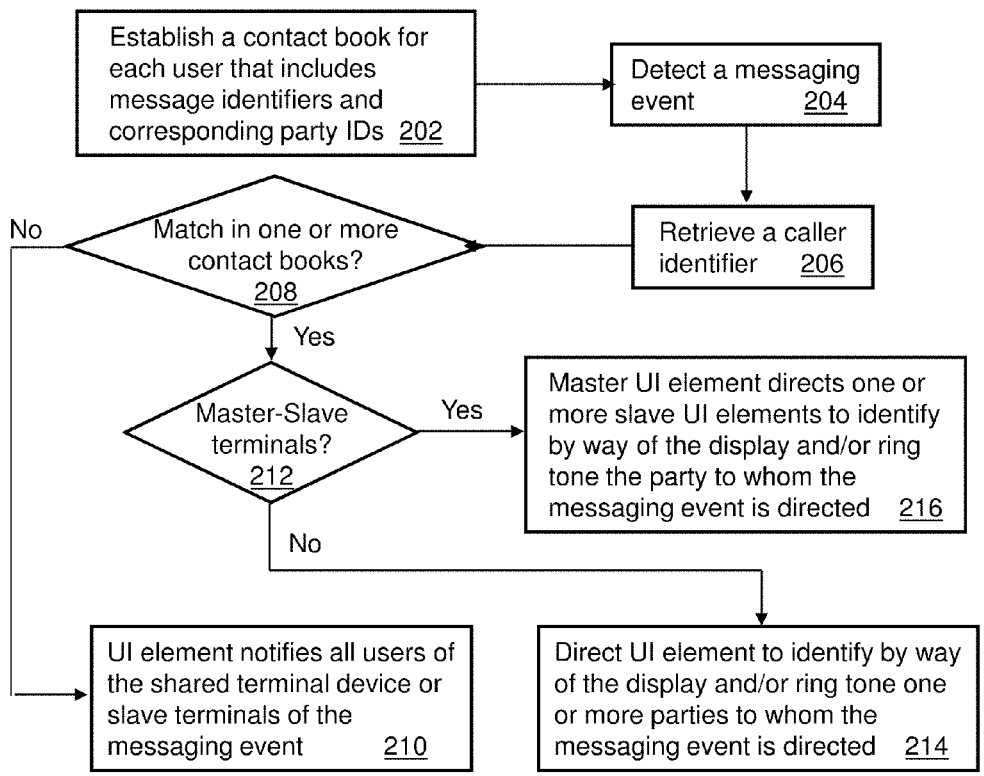
FIG. 2  200

METHOD AND APPARATUS FOR NOTIFYING AN END USER OF A MESSAGING EVENT IN A MULTI-USER SETTING

CROSS REFERENCE TO RELATED APPLICATIONS

This application is a continuation of U.S. patent application Ser. No. 11/549,382 filed Oct. 13, 2006 by Walter et al., entitled "METHOD AND APPARATUS FOR NOTIFYING AN END USER OF A MESSAGING EVENT IN A MULTI-USER SETTING", which is incorporated herein by reference in its entirety.

FIELD OF THE DISCLOSURE

The present disclosure relates generally to notification techniques and more specifically to a method and apparatus for notifying an end user of a messaging event in a multi-user setting.

BACKGROUND

Terminal devices such as cell phones and Personal Digital Assistants (PDAs) have become common staple communication devices for many people. Such devices have evolved over the years in complexity to perform a number of functions such as receiving calls, emails, pages, Short Message System (SMS) messages, instant messaging, and so on. When events such as these occur, the end user is notified by a User Interface (UI) such as an audible alert (e.g., ring tones) which directs the end user to view a display associated with the UI to identify the actual event (e.g., caller ID of incoming call, pending SMS message, etc.).

In a multi-user setting where a terminal device and/or a communication line are shared it can be difficult to know to whom a messaging event is directed.

A need therefore arises for a method and apparatus for notifying an end user of a messaging event in a multi-user setting.

BRIEF DESCRIPTION OF THE DRAWINGS

FIG. 1 depicts an exemplary embodiment of a terminal device;

FIG. 2 depicts an exemplary method operating in the terminal device;

DETAILED DESCRIPTION

Figure 3:
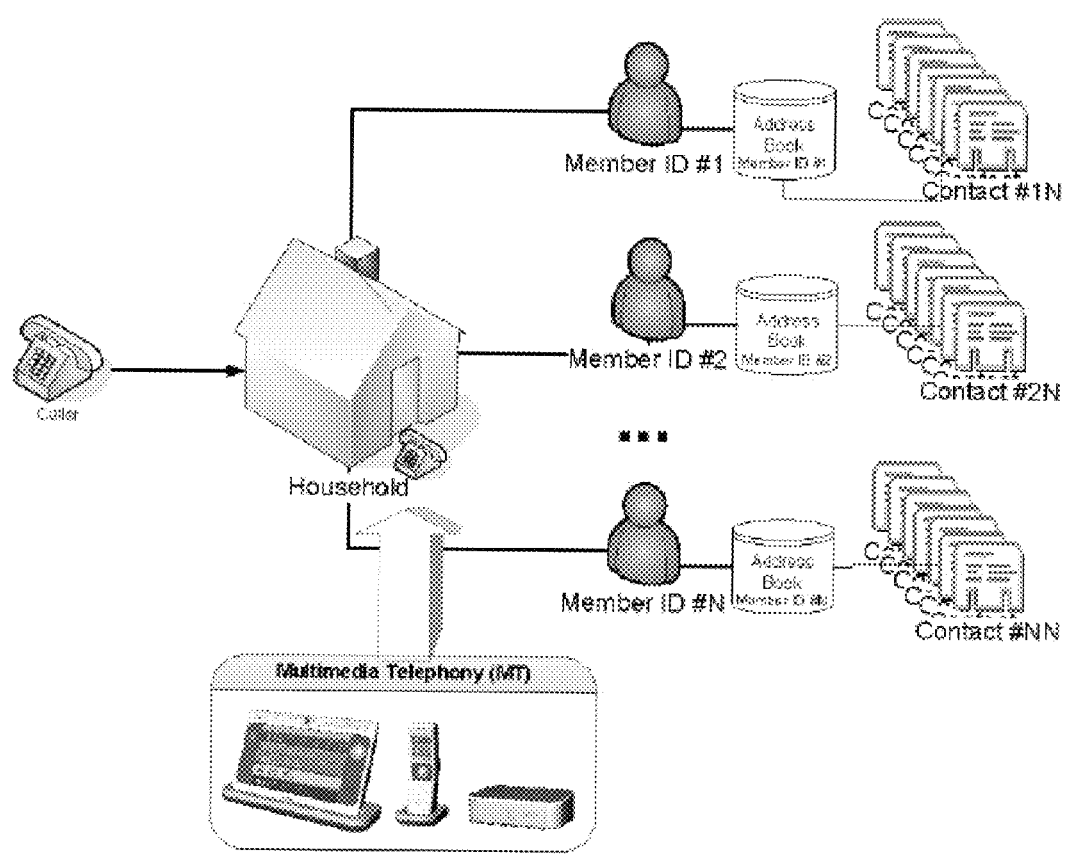
FIG. 3 depicts a multi-user setting for the terminal device.

Embodiments in accordance with the present disclosure provide a method and apparatus for notifying an end user of a messaging event in a multi-user setting.

In a first embodiment of the present disclosure, a terminal device can have a User Interface (UI) element that selectively identifies one or more parties to whom a messaging event is directed according to one or more matches between a caller identifier associated with the messaging event and one or more entries in a plurality of contact books corresponding to a plurality of users of the terminal device.

In a second embodiment of the present disclosure, a computer-readable storage medium in a terminal device can have computer instructions for identifying one or more parties to whom a messaging event is directed by way of at least one among a Graphical User Interface (GUI) and one or more ring tones responsive to one or more matches between a caller identifier associated with the messaging event and one or more entries in a plurality of contact books corresponding to a plurality of users of the terminal device.

In a third embodiment of the present disclosure, a method can have the step of identifying one or more parties to whom a messaging event is directed according to one or more matches between a caller identifier associated with the messaging event and one or more entries in a plurality of contact books corresponding to a plurality of users.

FIG. 1 depicts an exemplary embodiment of a terminal device 100. The terminal device 100 can comprise a wireless or wireline transceiver 102, a user interface (UI) 104, a power supply 116, and a controller 103 for managing operations of the foregoing components. The transceiver 102 can utilize common communication technologies to support singly or in combination any number of wireline access technologies such as cable, xDSL, Public Switched Telephone Network (PSTN), and so on. Singly or in combination with the wireline technology, the transceiver 102 can support singly or in combination any number of wireless access technologies including without limitation Bluetooth™, Wireless Fidelity (WiFi), Worldwide Interoperability for Microwave Access (WiMAX), Ultra Wide Band (UWB), software defined radio (SDR), and cellular access technologies such as CDMA-1x, W-CDMA/HSDPA, GSM/GPRS, TDMA/EDGE, and EVDO. SDR can be utilized for accessing public and private communication spectrum with any number of communication protocols that can be dynamically downloaded over-the-air to the terminal device 100. It should be noted also that next generation wireline and wireless access technologies can also be applied to the present disclosure.

The UI element 104 can include a keypad 106 with depressible or touch sensitive keys and a navigation element such as a navigation disk, button, roller ball, or flywheel for manipulating operations of the terminal device 100. The keypad 106 and its components can be illuminated by light sources such as light emitting diodes (LEDs) that can be adjusted to generate controlled light emissions of various colors. The UI element 104 can further include a display 108 such as monochrome or color LCD (Liquid Crystal Display) which can be touch sensitive for manipulating operations and for conveying images to the end user of the terminal device 100, and an audio system 110 that utilizes common audio technology for conveying and intercepting audible signals of the end user.

The power supply 116 can utilize common power management technologies such as replaceable batteries, supply regulation technologies, and charging system technologies for supplying energy to the components of the terminal device 100 and to facilitate portable applications. Depending on the type of power supply 116 used, the terminal device 100 can represent an immobile or portable communication device. The controller 103 can utilize computing technologies such as a microprocessor and/or digital signal processor (DSP) with associated storage memory such a Flash, ROM, RAM, SRAM, DRAM or other like technologies for controlling operations of the terminal device 100.

The terminal device 100 can further represent a single operational device or a family of devices configured in a master-slave arrangement. In the latter embodiment, the components of the terminal device 100 can be reused in different form factors for the master and slave terminal devices.

Figure 4:
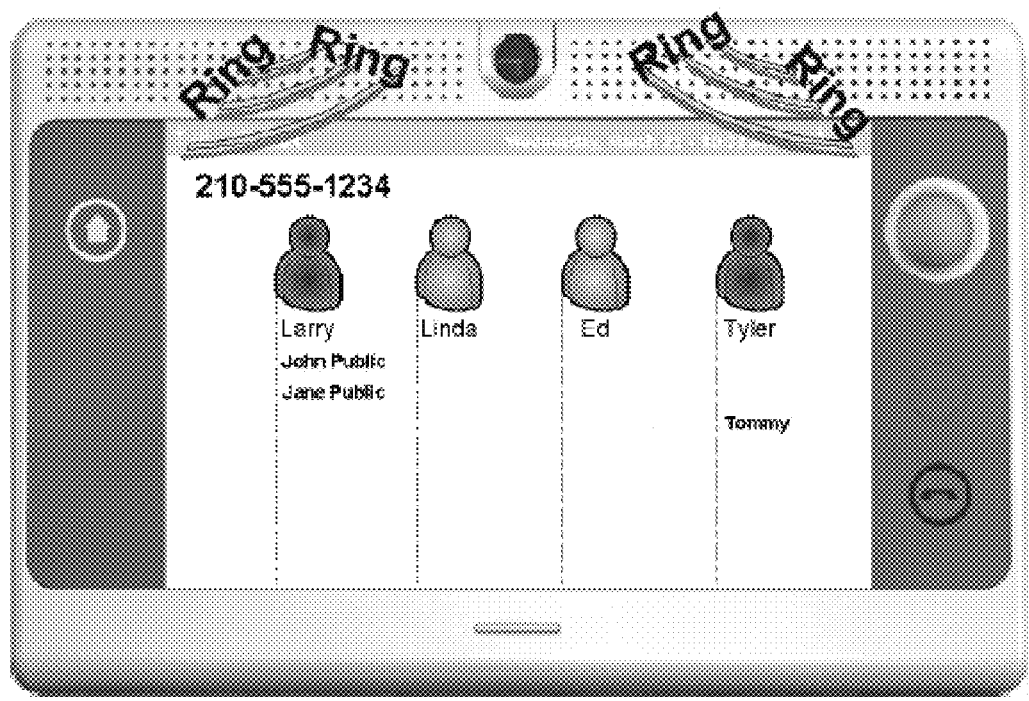
FIGS. 4-5 depict exemplary embodiments of a housing assembly for the terminal device.
Figure 5:
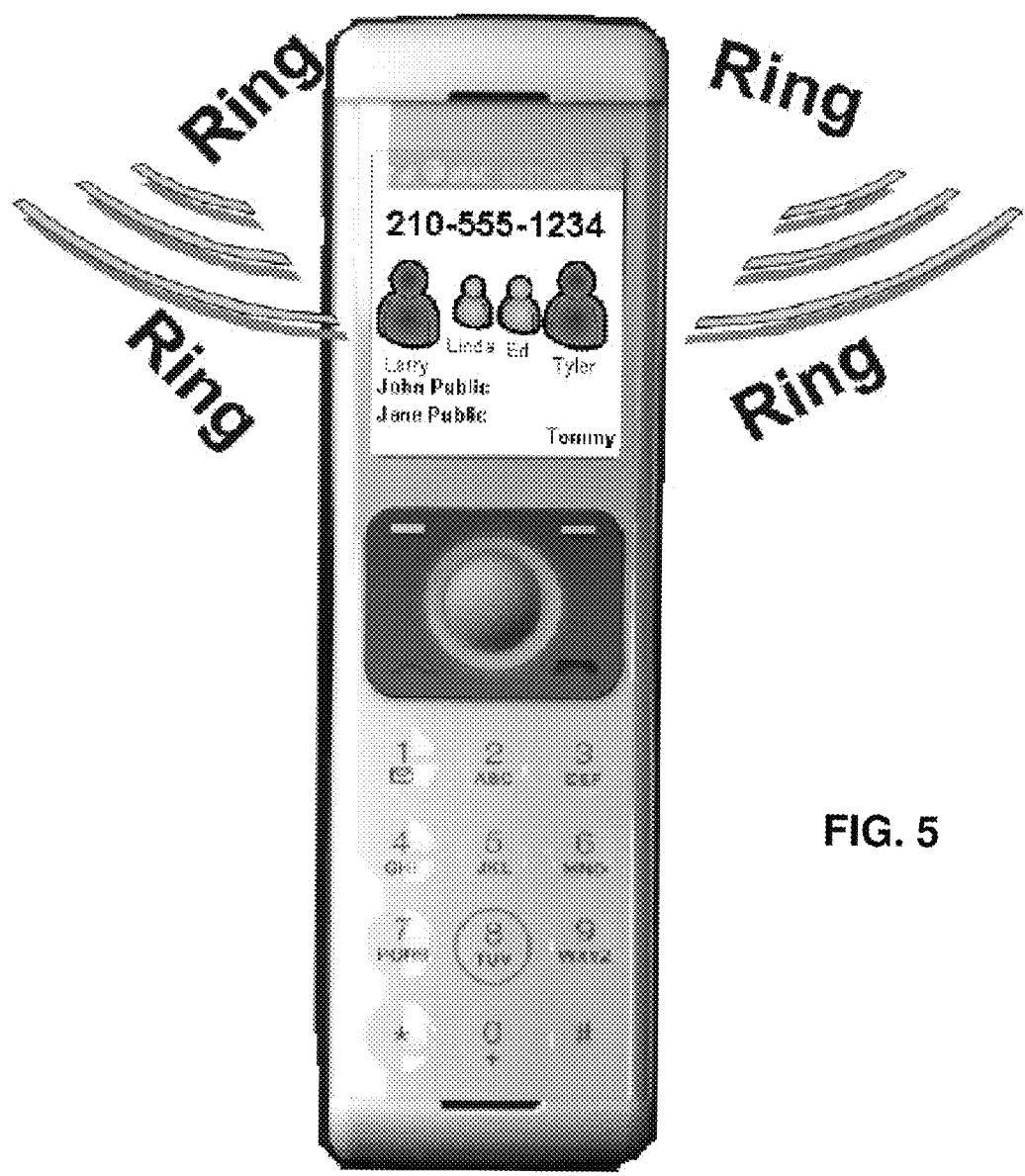

FIG. 2 depicts an exemplary embodiment of a method 200 operating in the terminal device 100. Method 200 begins with step 202 in which the terminal device 100 is programmed to establish a contact book for each user in a multi-user setting as depicted in FIG. 3. In a multi-user setting one terminal device 100 can be shared amongst all users, or a terminal device can be assigned to each user in a master-slave arrangement as previously described. In the latter case, the master terminal device can represent a frame or base unit as illustrated in FIG. 4 with a number of slave terminal devices such as handsets as depicted in FIG. 5. A transceiver element is included in each of the master and slave terminal devices for exchanging messages therebetween.

In step 202, a contact book is created by each user which includes a number of message identifier entries that are grouped with a party identifier. Message identifiers can correspond to a number ID, an IP address, a domain name, an IM address, an email address, or a geographic location—just to mention a few possibilities—any of which can be retrieved from an incoming message. For example, member #1 of a multi-user household may have as a first entry in her contact book corresponding to "John Doe" with home and mobile phone number IDs (e.g., 1-222-333-4444 and 1-333-444-5555, respectively). In this example, "John Doe" is the party identifier, and the home and mobile phone number IDs are the message identifiers. The same contact book entry can also have an IP address, a domain name of a website, an email address (home or business), an IM address, or a geographic location (e.g., home and/or business address).

The contact book of each member in a master-slave setting can be stored in the master terminal device, the slave terminal devices assigned to each user, or in a remote system from which the terminal devices can retrieve said contact book. A remote system can be a server managed by a service provider of a communication system from which the terminal devices operate, or a web server managed by an independent party.

Figure 6:
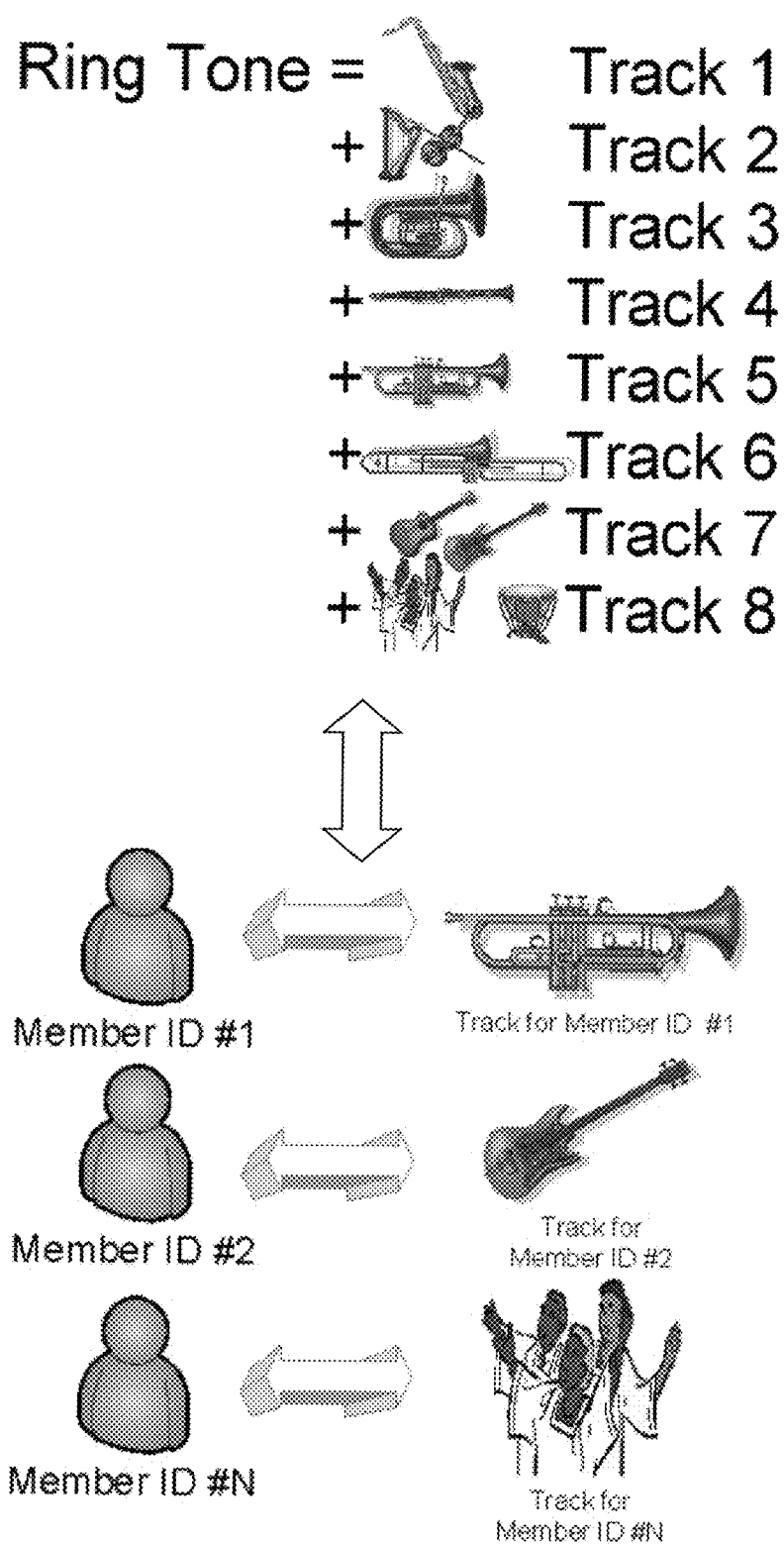
FIG. 6 depicts selectable ring tones for each user of the terminal device.

In the case of a single shared terminal device 100, the contact book of each user can be stored in the terminal device 100 or the remote system. Each contact book can be further associated with a distinct ring tone selected by each user from a list of ring tones as depicted in FIG. 6.

The aforementioned entries of each contact book and selection of ring tone can be established by an end user manually by way of the keypad 106. Alternatively, the end user can select a ring tone and create the contact book on a computer or on-line, and download the resulting contact book and ring tone by tethered wireline through, for example, a USB port, or wirelessly using a short range wireless system (e.g., Bluetooth or WiFi) or by way of a long-range communication system such as cellular network. To avoid users selecting the same ring tone, the single or master terminal device 100 can identify the ring tones not already selected in FIG. 6 by reducing the opacity of those used and maintain the unused ring tones as is.

Once each contact book has been stored and a distinct ring tone has been assigned to one or more party identifiers, the master or single terminal device 100 can proceed to step 204 where it is ready to detect messaging events. A messaging event can be generated by an incoming message. For example, a messaging event can comprise an incoming voice call initiated by a calling party, a voicemail associated with the calling party when the incoming call is unanswered, a call log entry identifying a missed call from a party who has not provided an accompanying voicemail, arrival of an email message, an SMS message, a page, an IM message. Other messaging events suitable to the present disclosure can be used.

Upon detecting a messaging event, the single or master terminal device 100 proceeds to step 206 to retrieve a caller identifier associated with the messaging event. The caller identifier can correspond to any message identifier that identifies the source of the messaging event. For example, during an incoming call, the caller identifier can represent a number ID of the calling party. The number ID can be extracted as an Automatic Number Identification (ANI) associated with a PSTN call. The number ID can alternatively be retrieved from Session Initiation Protocol (SIP) or H.323 signaling information associated with a VoIP or IP video call. A similar message identifier can be retrieved for voicemail, missed call logs, SMS messages, and pages. In the case of an email or IM message, the caller identifier is associated with the email or IM address of the sender.

Once the caller identifier has been retrieved from the messaging event, the terminal device 100 checks in step 208 for one or more matched message identifier entries in the plurality of contact books. If the contact books are stored in the single or master terminal device 100, the matching step is straightforward. If the contact books are stored in the slave terminal devices 100 or in a remote system, the terminal device 100 responsible for step 208 contacts the remote system by way of, for example, an Internet Protocol (IP) interface or the slave terminal devices by way of cordless technology, and retrieves the contact books to compare the caller identifier of the messaging event to entries therein. If no matched entries are found in any of the contact books, the single or master terminal device 100 proceeds to step 210 where the UI element 104 of said device notifies all users of the messaging event and directs the slave terminal devices (if any) to do the same.

In this step no recognition is made as to whom the messaging event is directed since there is no guidance from the contact books to make such a distinction. Thus, in a master-slave setting, the master and slave terminal devices all display a caller identifier associated with the messaging event in their respective UI elements 104 and all terminals assert their respectively assigned ring tones or a default shared ring tone.

If on the other hand a match is found, the terminal device 100 proceeds to step 212 to determine if a master-slave arrangement exists. If it is a single terminal arrangement, the terminal device 100 proceeds to step 214 where it directs the UI element 104 to identify by way of the display 108 and/or assigned ring tone played out by the audio system 110 the one or more parties to whom the messaging event is directed. Alternatively, in a master-slave setting, the master terminal device proceeds to step 216 where the master UI element of the master terminal device directs one or more slave UI elements to identify by way of the display and/or ring tone of said slave terminal devices the party to whom the messaging event is directed.

The terminal device of FIG. 4 demonstrates how the intended parties of a messaging event can be notified. In this illustration there are four members in a household: Larry, Linda, Ed and Tyler depicted by a Graphical User Interface (GUI) with iconic symbols. In Larry's contact book assume he has an entry for John and Jane Public with the number ID 1-210-555-1234, and Tyler has an entry in his contact book for Tommy with the same number. John and Jane Public are in this example the parents of Tommy, which is why the same number ID shows up in the contact books of Larry and Tyler. When the messaging event is detected and matched to Larry's and Tyler's contact book, Larry's and Tyler's icons flash and/or turn a different color (e.g., Red) from the icons of Linda and Ed. Below Larry's and Tyler's name the calling party's name is shown as described by the contact books of Larry and Tyler, with the caller identifier shown at the upper left corner of the display. Although it is not clear whether the messaging event is intended for Larry or Tyler, it is evident that the messaging event is not for Linda or Ed. Had Tyler not had the same number ID entry as Larry, it would have been evident that the messaging event is directed exclusively for Larry.

In a single terminal device setting, the ring tones assigned to Larry and Tyler respectively can alternate to indicate to Linda and Ed that the messaging event is not directed for them—just Larry and Tyler. In a master-slave setting, the master terminal can alternate the assigned ring tones, and the slave terminals assigned to Larry and Tyler can do the same or can assert only the ring tone assigned to said terminals. In either case, the slave terminal devices display a similar GUI to the master terminal device as shown in FIG. 5.

Upon reviewing the aforementioned embodiments, it would be evident to an artisan with ordinary skill in the art that said embodiments can be modified, reduced, or enhanced without departing from the scope and spirit of the claims described below. Accordingly, the reader is directed to the claims section for a fuller understanding of the breadth and scope of the present disclosure.

Figure 7:
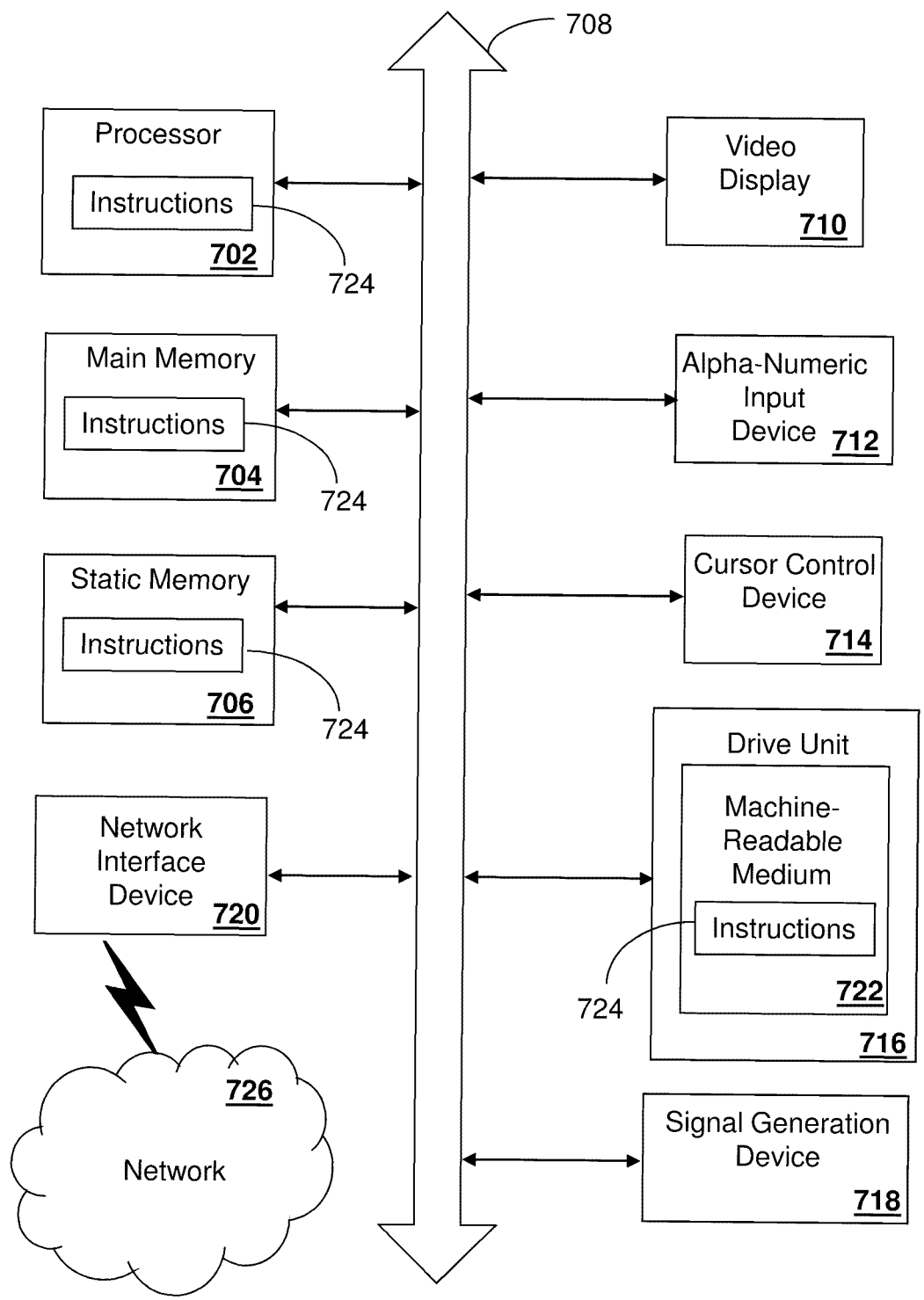
FIG. 7 depicts an exemplary diagrammatic representation of a machine in the form of a computer system within which a set of instructions, when executed, may cause the machine to perform any one or more of the methodologies disclosed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to email or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
a memory to store instructions; and
a controller coupled with the memory, wherein the controller, responsive to executing the instructions, performs operations comprising:
downloading ring tones over a communication network coupled to the communication device;
associating the ring tones to a targeted user;
identifying a caller identifier associated with a messaging event that is directed to a terminal device, wherein the communication device and the terminal device are in a master-slave relationship;
determining a match between the caller identifier and an entry in a contact book of a plurality of contact books that are associated with the terminal device;
identifying the targeted user from a plurality of users of the terminal device based on the match of the contact book; and
transmitting the ring tones associated with the targeted user to the terminal device to enable the terminal device to indicate, by presenting the ring tones, that the messaging event is intended for the targeted user.

2. The communication device of claim 1, wherein the ring tones are indicated by identification information associated with the targeted user.

3. The communication device of claim 1, comprising a wireless transceiver for wirelessly communicating with the terminal device.

4. The communication device of claim 2, wherein the identification information is provided to the terminal device utilizing an IP multimedia subsystem.

5. The communication device of claim 1, wherein the ring tones are presented at the terminal device in an alternating pattern, and wherein the alternating pattern is selected by the communication device.

6. The communication device of claim 1, wherein the messaging event comprises a voicemail associated with a calling party when an incoming call is unanswered.

7. The communication device of claim 1, wherein the caller identifier comprises a number identification retrieved from an incoming call.

8. The communication device of claim 1, wherein the messaging event a short messaging system message and wherein the controller comprises a group of controllers operating in a distributed processing environment.

9. A non-transitory tangible computer-readable storage medium, comprising instructions which, responsive to being executed by a processor of a communication device, cause the processor to perform operations comprising:
downloading ring tones over a communication network;
associating the ring tones to a targeted user;
matching a caller identifier associated with a messaging event directed to a terminal device and an entry in a contact book of a plurality of contact books corresponding to a plurality of users of the terminal device to determine a matching contact book;
identifying the targeted user from the plurality of users to whom the messaging event is potentially directed based on the matching contact book; and
generating a ring tone command for directing the terminal device to present the ring tones associated with the targeted user, wherein the communication device is remote from the terminal device.

10. The non-transitory tangible computer-readable storage medium of claim 9, further comprising instructions which, responsive to being executed by the processor of the communication device, cause the processor to perform operations comprising presenting an indication of the targeted user by way of the ring tones that correspond to each party of the targeted user in an alternating pattern.

11. The non-transitory tangible computer-readable storage medium of claim 9, wherein the processor further performs operations comprising receiving the messaging event.

12. The non-transitory tangible computer-readable storage medium of claim 9, wherein the messaging event comprises an incoming call initiated by a calling party wherein the processor comprises a group of processors operating in a distributed processing environment.

13. The non-transitory tangible computer-readable storage medium of claim 9, further comprising computer instructions which, responsive to being executed by the processor of the communication device, cause the processor to perform operations comprising providing identification information to the terminal device, wherein the identification information indicates the targeted user, and wherein the identification information enables the terminal device to present an indication of the targeted user by way of the ring tones and a graphical symbol that corresponds to the targeted user.

14. The non-transitory tangible computer-readable storage medium of claim 9, wherein the messaging event comprises an email.

15. A method, comprising:
  receiving, by a terminal device comprising a processor, ring tones over a communication network coupled to the terminal device;
  associating, by the terminal device, the ring tones to a targeted user;
  receiving, by the terminal device, user identification information from a communication device, wherein the communication device is remote from and communicatively coupled to the terminal device, and wherein the user identification information corresponds to a plurality of contacts books associated with a plurality of users of the terminal device, and wherein each of the plurality of users is associated with a ring tone;
  comparing, by the terminal device, a caller identifier associated with a messaging event and the user identification information to identify the targeted user to whom the messaging event is potentially directed; and
  presenting, by the terminal device, the associated ring tones at the terminal device for the targeted user to whom the messaging event is potentially directed.

16. The method of claim 15, further comprising presenting, by the terminal device, a corresponding graphical symbol for the targeted user to whom the messaging event is potentially directed.

17. The method of claim 15, wherein the messaging event comprises an incoming call initiated by a calling party.

18. The method of claim 15, wherein the caller identifier comprises a number identification retrieved from an incoming call.

19. The method of claim 15, wherein the messaging event comprises a short messaging system message.

20. The method of claim 15, wherein the presenting of the associated ring tones at the terminal device is in an alternating pattern.

* * * * *